INVENTOR.
GILBERT MEYERS

INVENTOR.
GILBERT MEYERS

ATTORNEYS

United States Patent Office 3,432,677
Patented Mar. 11, 1969

3,432,677
POWER SYSTEM FOR HIGH RISE APARTMENT BUILDINGS
Gilbert Meyers, 2497 Williams Court, Bellmore, N.Y. 11710
Filed Mar. 25, 1965, Ser. No. 442,738
U.S. Cl. 307—17                             5 Claims
Int. Cl. H02j 3/00; H01b 7/30; H02g 15/02

ABSTRACT OF THE DISCLOSURE

A high tension electrical wiring system for a high-rise building comprising a basement transformer vault and a roof transformer vault with a concrete elevator shaft extending between the basement and the roof. A hollow conduit is integrally encased in the concrete of the elevator shaft. At least one borehole cable extends the full length of the conduit from the basement to the roof and is electrically connected to the transformer vaults. A support beam overlies the conduit. Pothead means are secured to the beam for supporting the borehole cable so that the borehole cable extends the full distance vertically between the lower transformer vault and the upper transformer vault without the use of cable support boxes.

---

This invention relates generally to electrical wiring systems and more particularly to a high tension power system for high rise buildings, such as apartment houses, or the like.

With the advent of the high rise apartment buildings of over twenty or twenty-two stories, it has been found that the increased costs of installing electrical wiring systems tends to offset the possible additional revenue which might be derived as a result of the additional floors. This occurs primarily because of the long runs of heavy wire and conduits or bus ducts which are necessary to maintain the necessary voltage to the upper floors. Where standard construction techniques and methods are employed, it is necessary to have additional runs of low voltage wiring for each floor above the twenty-second story with the resulting increase in the cost of construction that would occur if conventional low voltage wiring were employed.

It is therefore an object of this invention to provide a high tension power system which will make feasible the construction of high rise apartment buildings of over twenty-two stories.

It is a further object of this invention to provide a high tension power system for use in high rise apartment buildings which will not require the use of heavy wire and bus ducts to transmit the necessary voltage to the upper floors.

Further, it is an object of the present invention to provide a high tension power system for use in high rise apartment buildings which will not take up valuable rental space from the building.

Further, it is an object of the present invention to provide a high tension power supply system for high rise apartment buildings which will provide a double power supply system for the entire building so that the building will not lose service should any transformer be damaged by fire or be put out of service for any other reason.

Further, it is an object of the present invention to provide a high tension power supply system for high rise apartment buildings which will be supplied with high tension power from two separate and independent sources so that in the event of an emergency, all vital services such as light, heat and elevator service could continue to be supplied to the tenants.

Further, it is an object of this invention to provide a high tension power supply system for use in high rise apartment buildings wherein transformers will be located both at the basement level and on the roof so as to independently supply the upper and lower portions of the building with adequate high voltage.

Still further, it is an object of the present invention to provide a high tension power supply system for high rise apartment building which will substantially reduce the costs of construction of such buildings and which will facilitate more efficient utilization of electrical power.

The construction of this invention features a high tension electrical wiring system for a high rise building having a roof and a basement with a multitude of stories therebetween. A lower transformer vault is situated in the basement or adjacent the basement of this building while an upper transformer vault is located on the roof of the building. The building has a concrete elevator shaft extending between the basement and the roof and hollow conduits are integrally encased in the concrete of the elevator shaft. Borehole cables extend the full length of the conduit from basement to roof. There is provided a support beam overlying said conduit, and borehole potheat means secured to said beam for supporting said borehole cable so that said borehole cable extends the full distance vertically between said lower transformer vault and said upper transformer vault without the use of cable support boxes.

Still further objects and features of this invention reside in the provision of a wiring system for high rise buildings that substantially reduce the cost of the erection of such multi-storied building, which is simple and efficient, less likely to have failures, in which lighter weight conduits and wire can be used and in which the conduit runs will be shorter than they would be were a conventional system used.

These, together with the various ancillary objects and features of this invention which will become apparent as the following description proceeds, are attained by this high tension power system for high rise buildings, a preferred embodiment of the invention being illustrated in the accompanying drawings, by way of example only, wherein.

Figure 1:
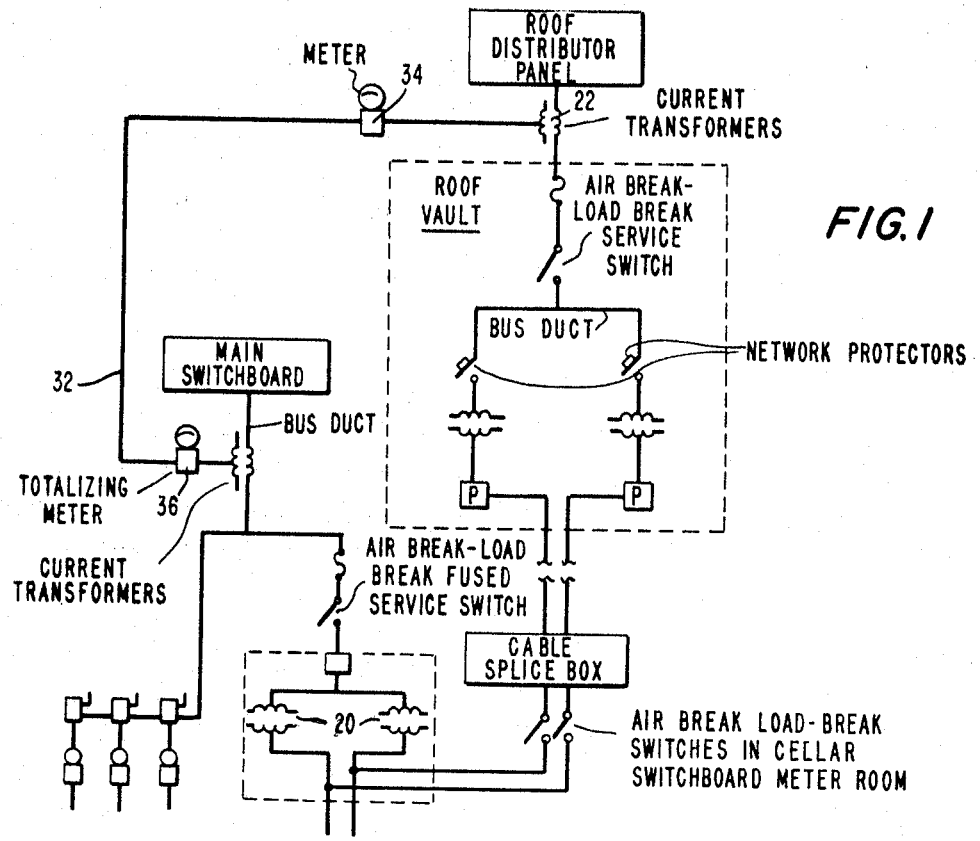
FIG. 1 is a schematic wiring diagram of an electrical power distribution system arranged in accordance with the concepts of the present invention.

With continuing reference to the accompanying drawings wherein like reference numerals designate similar parts through the various views, and with initial attention to FIG. 1 wherein there is illustrated a schematic layout of a high tension distributing system, it will be noted that there is shown the dual feed of primary power to transformer banks 20 and 22 respectively, arranged in the basement and on the roof of a building. The transformer bank 20 is situated in a lower transformer vault 24 in the basement of the building. A transformer vault area 26 for transformer bank 22 is provided which may be safeguarded in the conventional manner and in which suitable transformers to be provided by the public utilities are located.

The separation of the roof system, generally indicated at 28, from the basement system, generally indicated at 26, is almost complete. Only two lightweight conduits run from the basement to the roof. The conduit 32 connects the meter 34 on the input side of the roof transformer 22 with the totalizing meter 36 on the input side of the basement transformer vault. The second conduit, not shown, is an instrumentation line from the air conditioning controls in the basement to a cooling tower.

Figure 2:
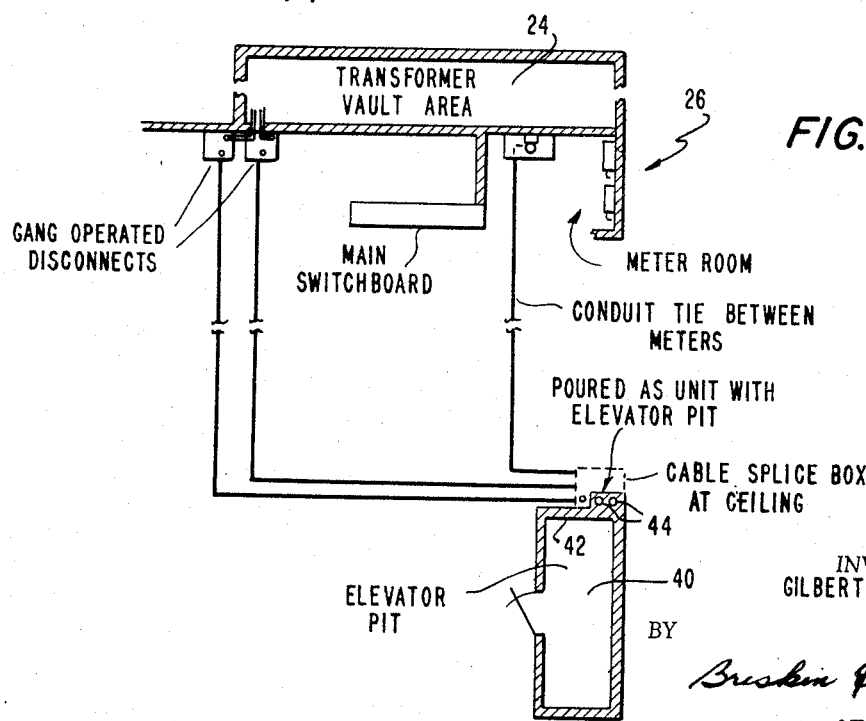
FIG. 2 is a sectional detail view through the basement of a high rise apartment building showing the elevator run-by room and arrangement of transformer banks according to the present invention.
Figure 3:
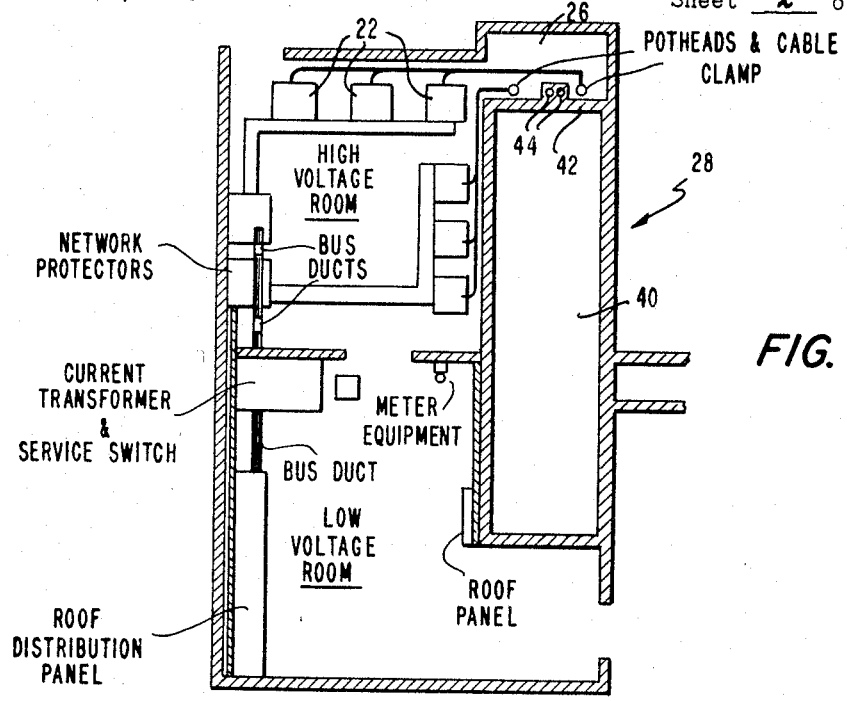
FIG. 3 is a horizontal sectional detail view through the roof installation of the elevator run-by room showing an arrangement of the transformer banks in a locked vault, the high tension wiring arrangement and location of the roof distribution panels.

As can be seen particularly in FIGS. 2 and 3, the high rise building is provided with an elevator shaft 40 which has poured concrete walls 42. Prior to the pouring of the concrete walls, hollow conduits 44 are disposed within the forms for pouring the walls 42. The conduits 44 are arranged so that borehole cable can be dropped and extend all the way downward from the roof to the basement.

Figure 4:
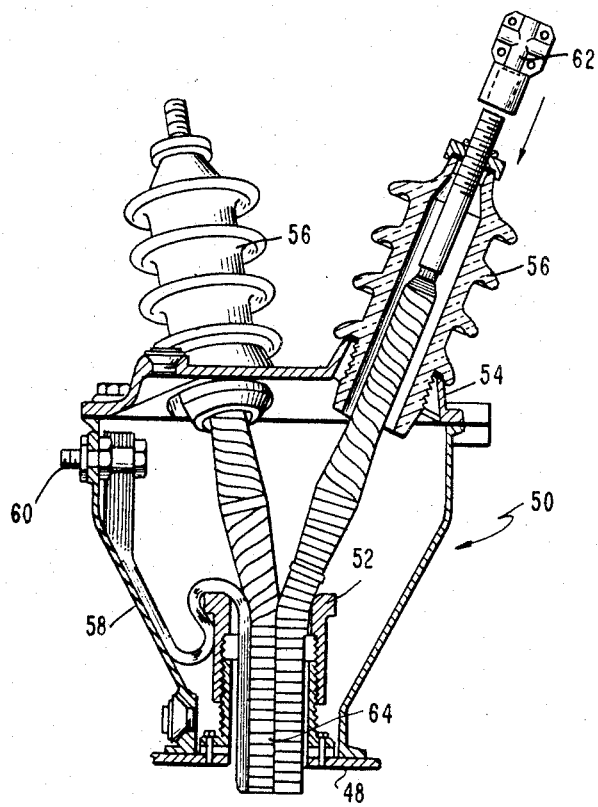
FIG. 4 is a sectional detail view illustrating the manner in which the borehole pothead means is used to support the borehole cable.

Arranged above in alignment with, and extending across the conduit 44 is a beam or plate 48 to which a borehole pothead 50 is adapted to be bolted or otherwise secured. The borehole pothead 50 serves as a cable support and in fact includes the cable support 52, a cast iron lid 54; three porcelain tube insulators 56 and a cast iron body 58 having a grounding stud 60. Special style lugs of the shape as shown in FIG. 4 and indicated by reference numeral 62 are used to connect the cable to other electrical connectors. The borehole cable extends through the cable support 42 and is provided with suitable cable shielding tape thereon or other insulating tape as found necessary. The borehole cable 64 extends through the conduit 44 vertically from roof to basement of the high rise building, which is, for example, over thirty stories high without requiring any other cable support than the cable support 22 at roof level. This results in a tremendous saving and facilitates removing and replacement of the borehole cable as may be necessary.

Connected to the lug 62 and hence to the borehole cable are high tension supply leads which are then connected to the transformer bank 22. The transformer bank is formed of a plurality of relatively small transformers instead of large ones, which use of a plurality of small transformers is dictated less by space consideration, although such is a factor, but also by a desire to provide greater reliability to the system. An additional advantage of using the relatively small transformers 22 on the roof is that in the unlikely event that one has to be replaced, it can be moved easily. A trap door located just outside the door will permit lowering the transformer to the floor to which the elevator will rise and the replacement is thus simplified.

A latitude of modification, substitution and change is intended in the foregoing disclosure, and in some instances, some features of the invention will be employed without a corresponding use of other features. Accordingly, it is appropriate that the appended claims be construed broadly and in a manner consistent with the spirit and scope of the present invention.

I claim:
1. A high tension electrical wiring system for a high rise building comprising an upper transformer vault on the roof of the building, a hollow conduit extending substantially the height of the building, a borehole cable extending the full length of said conduit, said borehole cable being electrically connected to said upper transformer vault, a support beam overlying said conduit, and means secured to said beam for supporting said borehole cable so that said borehole cable does not require the use of cable support boxes.

2. A high tension electrical wiring system for a high rise building comprising a lower transformer vault in the basement of a building, an upper transformer vault near the roof of the building, a borehole cable extending substantially between said upper and lower transformer vaults, and means for supporting said borehole cable so that said borehole cable extends the full distance vertically between said lower transformer vault and said upper transformer vault without the use of cable support boxes.

3. In a high rise building having a plurality of stories and a roof and a basement, a high tension vault on said roof, high tension supply leads to said transformer vaults, a concrete elevator shaft extending between said basement and said roof, hollow conduits, integrally encased in the concrete of said elevator shaft, a borehole cable extending the full length of said conduits from basement to roof, a support beam overlying said conduits, and borehole pothead means secured to said beam for supporting said borehole cable so that said borehole cable extends the full distance vertically between the basement and said upper transformer vault without the use of cable support boxes.

4. A high tension electrical wiring system according to claim 3 wherein said means are bolted to said beam.

5. A high tension electrical wiring system according to claim 4, wherein said supply lead to said upper transformer vault is connected to said means and thence to said cable.

References Cited

UNITED STATES PATENTS 2,076,650    4/1937    Kettron _____ 174—49

OTHER REFERENCES

Pender, H. and Delmar, W. A.: Electrical Engineer's Handbook. New York, John Wiley & Sons, Inc., 1958 TK 151. P. 4, 1949 v. 1, C. 3 (p. 14–145 relied on).

ROBERT K. SCHAEFER, *Primary Examiner.*

T. B. JOIKE, *Assistant Examiner.*

U.S. Cl. X.R.

307—147; 174—49, 74